(12) United States Patent (10) Patent No.: US 12,617,444 B2
Li (45) Date of Patent: May 5, 2026

(54) ELECTRIC MINI PUSH CART

(71) Applicant: WEIFANG AUSTTER INDUSTRY AND TRADE CO., LTD., Weifang (CN)

(72) Inventor: Chencheng Li, Weifang (CN)

(73) Assignee: WEIFANG AUSTTER INDUSTRY AND TRADE CO., LTD., Weifang (CN)

( * ) Notice: Subject to any disclaimer, the term of this patent is extended or adjusted under 35 U.S.C. 154(b) by 403 days.

(21) Appl. No.: 18/327,897

(22) Filed: Jun. 2, 2023

(65) Prior Publication Data

US 2023/0406386 A1 Dec. 21, 2023

(30) Foreign Application Priority Data

| | | | |
|---|---|---|---|
| Jun. 13, 2022 | (CN) | .......................... | 202221460114.0 |
| Jun. 13, 2022 | (CN) | .......................... | 202221460133.3 |
| Jun. 13, 2022 | (CN) | .......................... | 202221499594.1 |
| Jun. 15, 2022 | (CN) | .......................... | 202221497182.4 |
| Jun. 15, 2022 | (CN) | .......................... | 202221497217.4 |
| Jun. 15, 2022 | (CN) | .......................... | 202221497297.3 |

(51) Int. Cl.
*B62B 3/06* (2006.01)
*B62B 5/00* (2006.01)
*B62B 5/04* (2006.01)

(52) U.S. Cl.
CPC .......... *B62B 3/0618* (2013.01); *B62B 5/0033* (2013.01); *B62B 5/0438* (2013.01)

(58) Field of Classification Search
CPC ................................ B62B 3/08; B62B 3/0618
See application file for complete search history.

(56) References Cited

U.S. PATENT DOCUMENTS

| | | | | |
|---|---|---|---|---|
| 4,645,264 | A * | 2/1987 | Morrison | ............. B62D 51/005 |
| | | | | 165/41 |
| 5,350,030 | A * | 9/1994 | Mawhinney | .............. B62B 1/24 |
| | | | | 180/215 |
| 6,257,358 | B1 * | 7/2001 | Roach | .................... B62D 51/04 |
| | | | | 180/19.1 |
| 10,112,635 | B1 * | 10/2018 | Jin | ............................ B62B 3/08 |
| 10,384,704 | B2 * | 8/2019 | Fielder | ...................... B60P 1/28 |
| 11,400,966 | B2 * | 8/2022 | Kato | ......................... B62B 5/06 |
| 11,820,381 | B2 * | 11/2023 | Waldon | .................. B60K 23/00 |
| 12,151,732 | B2 * | 11/2024 | Sugimura | ............... B60K 1/04 |

(Continued)

FOREIGN PATENT DOCUMENTS

KR 20150000828 U 2/2015

*Primary Examiner* — Jonathan Snelting
(74) *Attorney, Agent, or Firm* — Hemisphere Law, PLLC

(57) ABSTRACT

An electric mini push cart provided includes a cart frame, an operation platform, a bucket, and a hydraulic power device. The operation platform arranged on the rear side. The bucket is configured to load objects and located on one side of the operation platform. The hydraulic power device drives the bucket to turn over, the hydraulic power device is installed on the cart frame and located below the bucket, the hydraulic power device includes a piston rod connected to the first end. When the hydraulic power device is working, the piston rod is stretched or retracted to push or pull back the first end, so that the bucket turns around the second end, and moves away from the operation platform or falls back towards the operation platform.

19 Claims, 23 Drawing Sheets

(56)         References Cited

U.S. PATENT DOCUMENTS

| 2006/0119164 | A1* | 6/2006 | Heskin | ..................... | B62B 3/08 |
| | | | | | 298/1 C |
| 2018/0079439 | A1* | 3/2018 | Dettner | .................... | B62B 1/24 |
| 2021/0039697 | A1 | 2/2021 | Shibata | | |

* cited by examiner

ELECTRIC MINI PUSH CART

CROSS REFERENCE TO RELATED APPLICATION

This non-provisional patent application claims priority under 35 U. S. C. § 119 from Chinese Patent Applications No. 202221499594.1, 202221460133.3 both filed on Jun. 13, 2022, Chinese Patent Applications No. 202221497217.4, No. 202221497182.4, No. 202221497297.3, No. 2022214601140 filed on Jun. 16, 2022, the entire content of which is incorporated herein by reference.

TECHNICAL FIELD

The disclosure relates to vehicles, in particular to an electric mini push cart.

BACKGROUND

Due to small size, electric mini push carts are adapted in small spaces. Therefore, the electric mini push carts have great advantages in some items that objects with little weight and small volume are need to quickly transfer. For example, sand and gravel handling in family buildings, grain handling in rural areas, etc., and the electric mini push carts are widely used.

Existing electric mini push carts mainly include hand-carts, small trailers, electric tricycles and the like. However, the existing electric mini push carts often load and unload of the objects manually, which is inconvenient to use.

There fore, there is a room for improving the electric mini push carts.

SUMMARY

An electric mini push cart provided includes a cart frame, an operation platform, a bucket, and a hydraulic power device. The operation platform arranged on the rear side. The bucket is configured to load objects and located on one side of the operation platform. The hydraulic power device drives the bucket to turn over, the hydraulic power device is installed on the cart frame and located below the bucket, the hydraulic power device includes a piston rod connected to the first end. When the hydraulic power device is working, the piston rod is stretched or retracted to push or pull back the first end, so that the bucket turns around the second end, and move away from the operation platform or falls back towards the operation platform.

The above-mentioned small electric mini push cart is provided with a hydraulic power device, which can drive the hydraulic power device to turn over the bucket for loading and unloading, effectively realizing the small truck with electric dump, saving time and effort, and improving efficiency.

BRIEF DESCRIPTION OF THE DRAWINGS

In order to more clearly illustrate the technical solutions in the embodiments of the present application or the prior art, the following will briefly introduce the drawings that need to be used in the description of the embodiments or the prior art. Obviously, the accompanying drawings in the following description are only These are some embodiments of the present application, and those skilled in the art can also obtain other drawings according to the structures shown in these drawings without creative effort.

The realization, functional features and advantages of the present application will be further described in conjunction with the embodiments and with reference to the accompanying drawings.

DETAILED DESCRIPTION OF THE EMBODIMENTS

In order to make the purpose, technical solution and advantages of the present application clearer, the present application will be further described in detail below in conjunction with the accompanying drawings and embodiments. It should be understood that the specific embodiments described here are only used to explain the present application, not to limit the present application. Based on the embodiments in this application, all other embodiments obtained by persons of ordinary skill in the art without making creative efforts belong to the scope of protection of this application.

The terms "first", "second", "third", "fourth", etc. (if any) in the description and claims of this application and the above drawings are used to distinguish similar planning objects and do not necessarily Used to describe a specific sequence or sequence. It is to be understood that the terms so used are interchangeable under appropriate circumstances; in other words, the described embodiments are practiced in sequences other than those illustrated or described herein. In addition, the terms "comprising" and "having" and any variations thereof may also include other contents, for example, a process, method, system, product or device comprising a series of steps or units is not necessarily limited to only those explicitly listed instead, may include other steps or elements not explicitly listed or inherent to the process, method, product or apparatus.

It should be noted that the descriptions in this application involving "first", "second" and so on are for descriptive purposes only, and should not be understood as indicating or implying their relative importance or implicitly indicating the number of indicated technical features. Thus, a feature defined as "first" or "second" may explicitly or implicitly include one or more of these features. In addition, the technical solutions of the various embodiments can be combined with each other, but it must be based on the realization of those skilled in the art. When the combination of technical solutions is contradictory or cannot be realized, it should be considered that the combination of technical solutions does not exist, nor within the scope of protection required by the present application.

Figure 1:
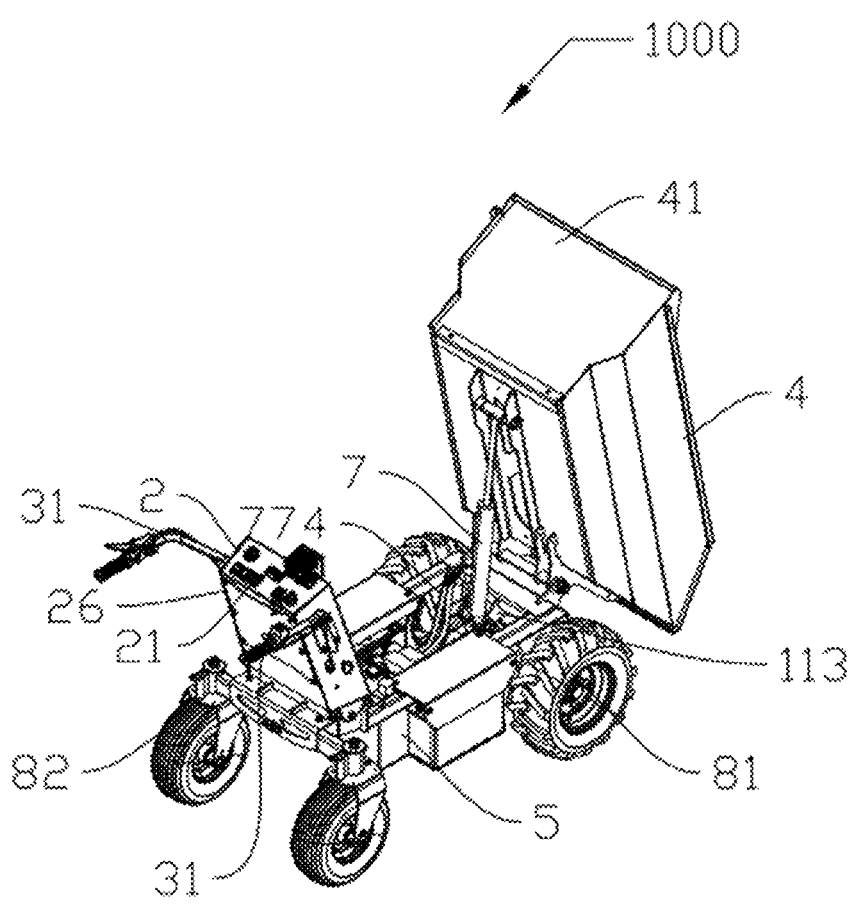
FIG. 1 is a perspective view of an electric mini push cart in accordance with a first embodiment.
Figure 2:
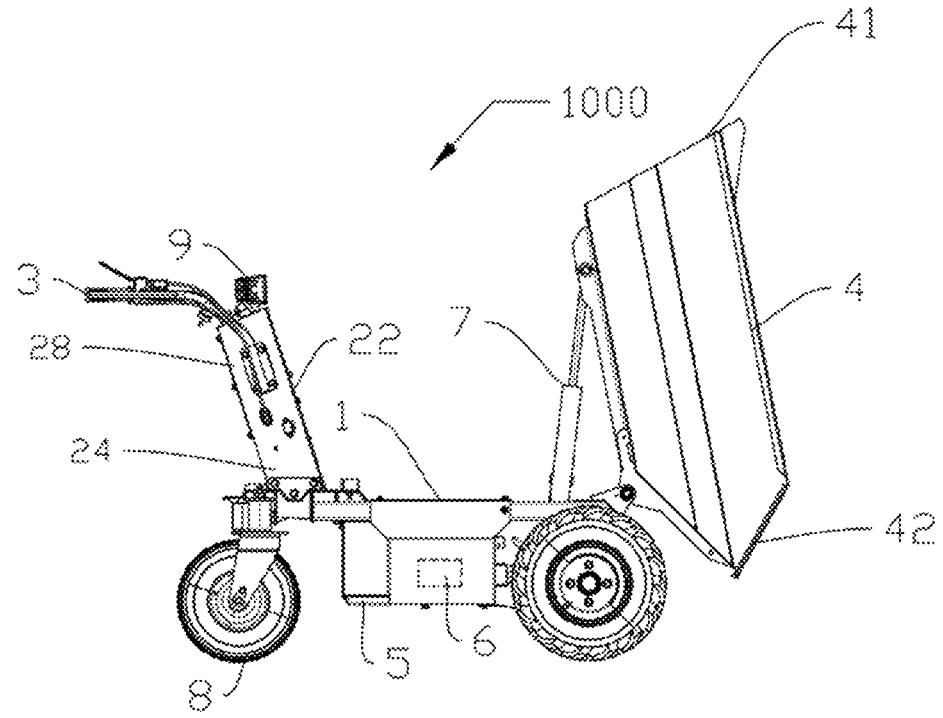
FIG. 2 is another perspective view of the electric mini push cart shown in FIG. 1.
Figure 3:
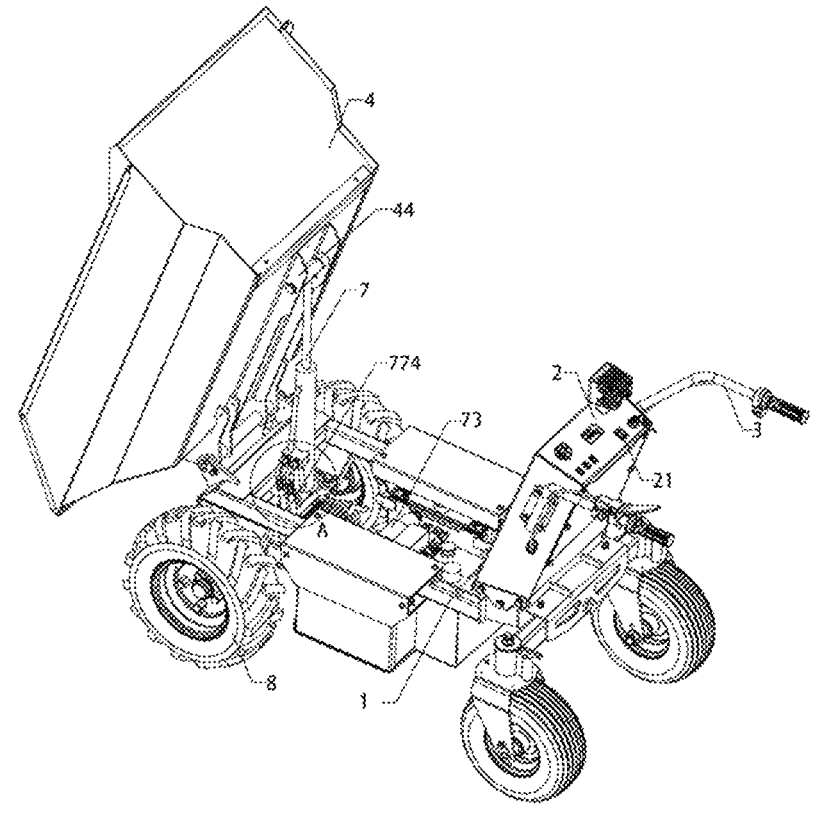
FIG. 3 is another perspective view of the electric mini push cart shown in FIG. 1.

Referring to FIGS. 1-3, perspective views of an electric mini push cart at three different angles are illustrated. The electric mini push cart 1000 includes a cart frame 1, an operation platform 2, a handle assembly 3, a bucket 4, a hydraulic power device 7, and a wheel assembly 8. The operation platform 2, the handle assembly 3, the bucket 4, the hydraulic power device 7, and the wheel assembly 8 are installed on the cart frame 1. The wheel assembly 8 supports the cart frame 1 and make the electric mini push cart 1000 move. The operation platform 2 is adjacent to the bucket 4 and is located at the rear side of the cart frame 1. The handle assembly 3 is arranged on the operation platform 2 and extends away from the bucket 4. The bucket 4 is supported by the cart frame 1 and is used for loading objects. The hydraulic power device 7 is located below the bucket 4 and is connected with the bucket 4. The hydraulic power device 7 drives the first end 41 of the bucket 4 close to the operation platform 2 to rise relative to the cart frame 1 and to move away from the operation platform 2 relative to the cart frame 1, and the first end 41 is flipped to the second end 42; and the hydraulic power device 7 further drives the first end 41 to fall back on the cart frame 1. The operation platform 2 is provided with an operating assembly 21 for the user to operate and control the hydraulic power device 7 to work.

Figure 4:
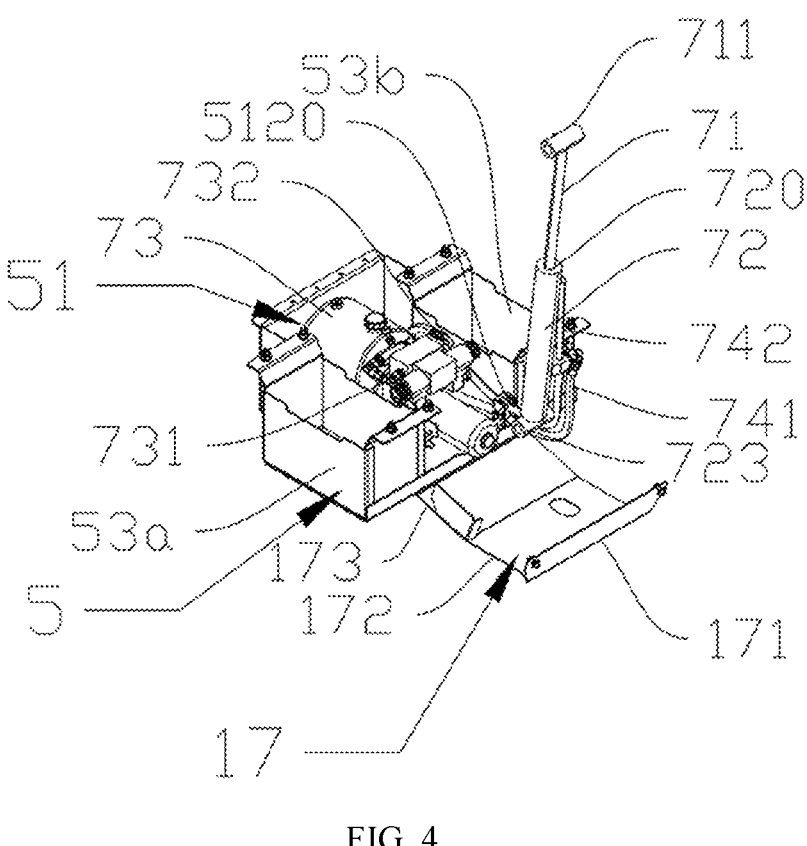
FIG. 4 is a perspective view of the hydraulic power device of the electric mini push cart shown in FIG. 1.
Figure 5:
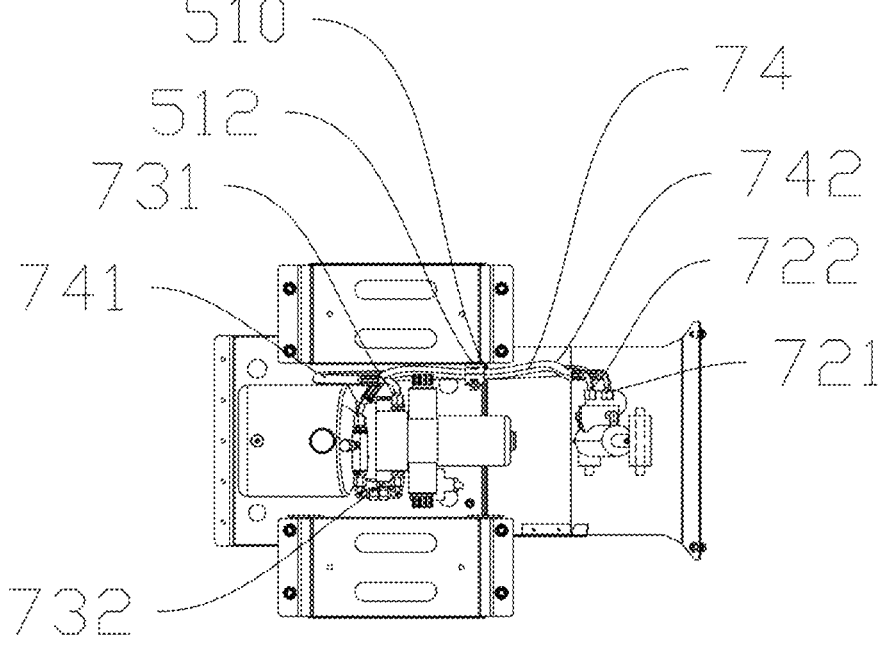
FIG. 5 is a top view of the hydraulic power unit shown in FIG. 4.

Referring to FIGS. 4-5, FIG. 4 illustrates a perspective view of the hydraulic power device in accordance with this embodiment. FIG. 5 illustrates a top view of the hydraulic power device in accordance with this embodiment. The hydraulic power device 7 includes a hydraulic power unit 73, an oil cylinder 72, a hydraulic oil pipe 74 connected between the oil cylinder 72 and the hydraulic power unit 73, and a piston rod 71 movably installed in the oil cylinder 72. The hydraulic power unit 73 and the oil cylinder 72 are arranged on the cart frame 1 at intervals. One end of the oil cylinder 72 away from the piston rod 71 is connected with the cart frame 1, and one end of the piston rod 71 away from the oil cylinder 72 is connected with the bucket 4, so that the bucket 4 is rotationally connected with the cart frame 1. The hydraulic power unit 73 is arranged on the cart frame 1 to provide hydraulic oil to the oil cylinder 72 through the hydraulic oil pipe 74 to drive the piston rod 71 to reciprocate along the oil cylinder 72 so that the piston rod 71 can be stretch out and draw back In this embodiment, the hydraulic power unit 73 is a mini hydraulic power unit (HPU), including a motor (not shown), a solenoid valve (not shown), and a hydraulic oil tank (not shown). The mini hydraulic power unit 73 is electrically connected with the operating assembly 21 of the operation platform 2 through a cable (not shown). The user operates the hydraulic power device 7 through the operating assembly 21.

The oil cylinder 72 is cylindrical, and the cylinder 72 has a cylindrical mounting groove 720 inside. An end of the oil cylinder 72 away from the piston rod 71 is provided with a first mounting portion 723. The first mounting portion 723 is cylindrical, and is perpendicular to the oil cylinder 72, and two opposite ends of the the first mounting portion 723 are respectively fixed on the front side of the cart frame 1 away from the operation platform 2.

The piston rod 71 is a round rod. The piston rod 71 is inserted in the installation groove 720 and can move axially along the oil cylinder 72 in the installation groove 720. The end of the piston rod 71 away from the oil cylinder 72 is provided with a second mounting portion 711. The second mounting portion 711 is in the shape of a cylinder, which is perpendicular to the oil cylinder 72, and has two opposite ends respectively fixed on the bucket 1 and close to the first end 41.

The hydraulic oil pipe 74 includes an oil outlet pipe 741 and an oil return pipe 742, and the hydraulic power unit 73 includes a first oil outlet 731 and a first oil return port 732. The oil cylinder 72 includes a second oil outlet 721 and a second oil return 722. The first oil outlet 731 communicates with the second oil outlet 721 through an oil outlet pipe 741, and the first oil return port 732 communicates with the second oil return port 722 through an oil return pipe 742. The first oil return port 732 and the first oil outlet port 731 are respectively located on different opposite sides of the hydraulic power unit 73, and the second oil return port 722 and the second oil outlet port 721 are respectively located on the same side of the oil cylinder 72.

Figure 6:
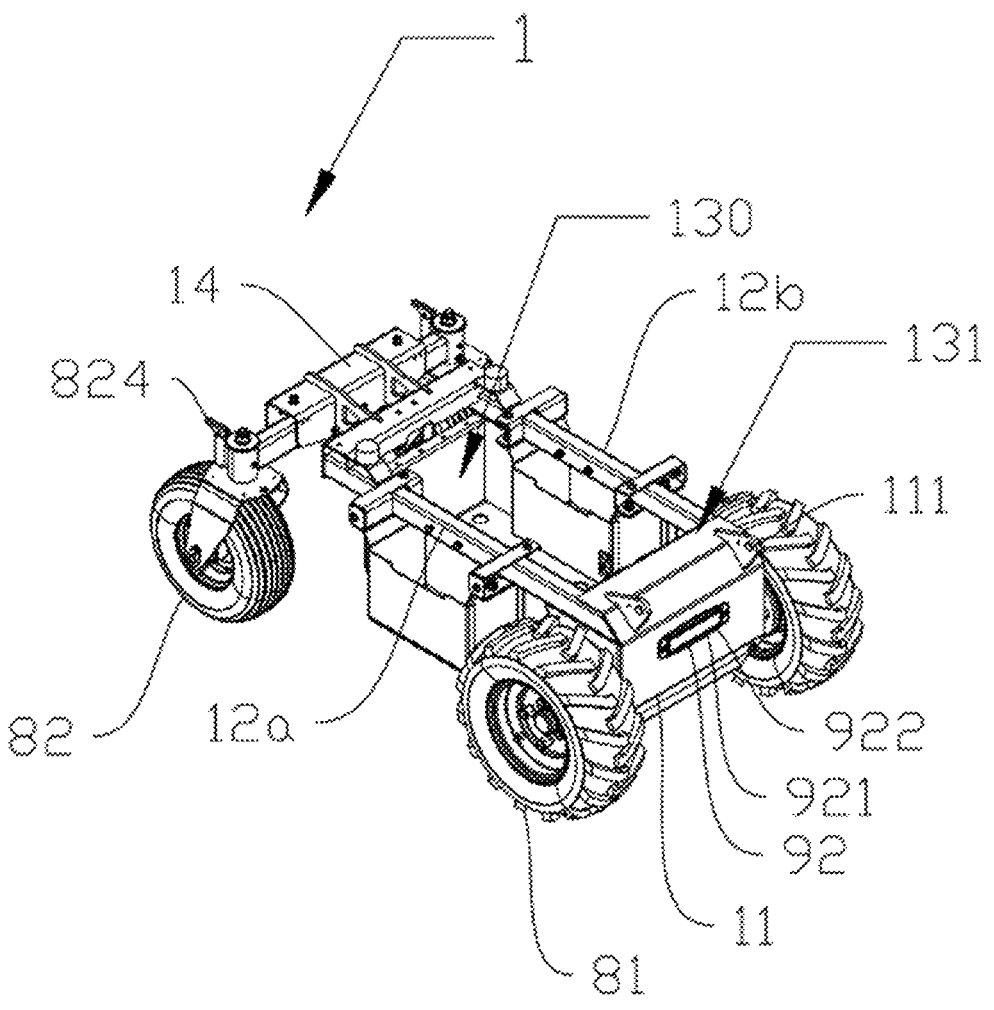
FIG. 6 is a schematic diagram of an assembled state of the cart frame and the wheel assembly of the electric mini push cart shown in FIG. 1.
Figure 7:
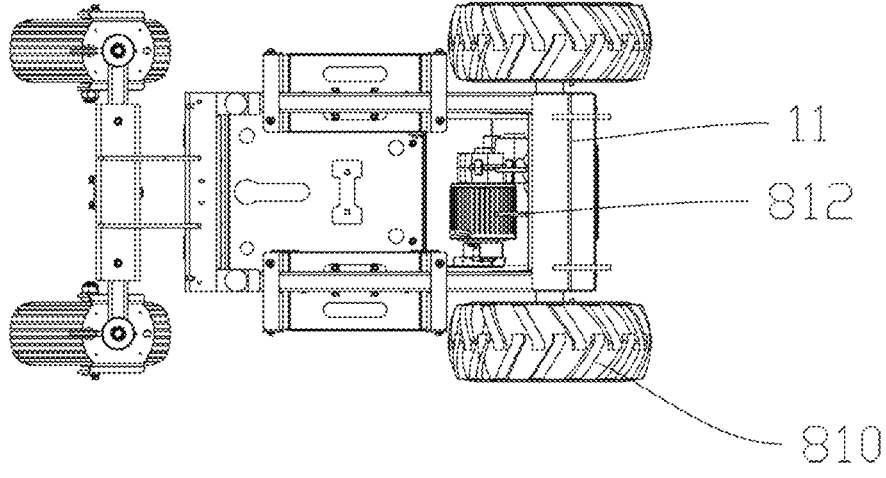
FIG. 7 is a schematic diagram of another assembled state of the cart frame and the wheel assembly shown in FIG. 1.

Referring to FIGS. 1, 6-7, the cart frame 1 includes a front fender 11, and two symmetrical longitudinal beams 12a, 12b. The front fender 11 is arranged opposite to the operation platform 2, and the two longitudinal beams 12a and 12b are respectively located between the front fender 11 and the operation platform 2. Ends of the two longitudinal beams 12a and 12b are respectively connected with the front fender 11 and the operation platform 2, thereby forming a cart frame 13. The cart frame 13 forms a hollow opening 130 and a horizontal bearing surface 131. The bucket 4 is placed flat on the bearing surface 131. A pair of first connecting ears 111 and a pair of second connecting ears 113 are disposed on the front fender 11. The pair of first connecting ears 111 are roughly triangular and symmetrically arranged at intervals, and the pair of first connecting ears 111 are arranged obliquely from the top of the baffle plate 11 away from the operation platform 2. The pair of second connecting ears 113 extend obliquely downward from the side of the front fender 11 facing the operation platform. The pair of second connecting ears 113 are approximately triangular in shape and arranged symmetrically at intervals. The first mounting portion 723 is located between the second connecting ears 113, and two ends respectively pass through the second connecting ears 113, and are rotatably mounted on the pair of second connecting ears 113 by a fixing member (not shown).

Referring to FIG. 4-5, an assembly box 5 and a reinforcing plate 17 are also installed on the cart frame 1. The assembly box 5 is installed on the side of the cart frame 13 away from the bearing surface 131, so that the assembly box 5 is suspended from the cart frame 1 and below the bucket 4. The assembly box 5 includes a first receiving portion 51 and two second receiving portions 53a, 53b located on both sides of the first receiving portion 51. The first receiving part 51 protrudes towards the operation platform 2 and beyond the second receiving part 53a, 53b. The reinforcing plate 17 is a thin metal plate, and the reinforcing plate 17 includes a fixing plate 171, a shielding plate 172, and a connecting plate 173 integrally formed. The shielding plate 172 is located between the fixing plate 171 and the connecting plate 173. The connecting plate 173 is an inclined plate, and one end of the connecting plate 173 is connected to the bottom of the assembly box 5, in detail, one end of the connecting plate 173 is connected to the bottom of the first receiving portion 51. The shielding plate 172 is flat. The fixing plate 171 extends upward from an end of the shielding plate 172 away from the connecting plate 173 and bent, and the fixing plate 171 is attached and fixed to the front fender 11. That is to say, the reinforcing plate 17 is connected between the assembly box 5 and the front fender 11, so that the assembly box 5 is more stably suspended on the cart frame 1.

The first receiving part 51 is configured to receive the hydraulic power unit 73. One of the oil outlet pipe 741 and the oil return pipe 742 is located in the first receiving portion 51 and is wound around the hydraulic power unit 73, and the other one of the oil outlet pipe 741 and the oil return pipe 742 extends adjacently and side by side. A through hole 510 and a limiting portion 512 are disposed on a side of the first receiving portion 51 facing the front fender 11. The oil supply pipe 741 and the oil return pipe 742 pass through the through hole 510 from the first receiving portion 51. The limiting portion 512 is a block disposed outside the first receiving portion 51. The limiting portion 512 partially covers the through hole 510 and is provided with two limiting holes 5120, the oil pipe 741 and the oil return pipe 742 pass through the limiting holes 5120 and are inserted into the oil cylinder 72.

The second receiving portions 53a, 53b are respectively used for placing the battery pack 6. Wherein, the battery packs 6 in the second receiving portions 53 a and 53 b are the same, so that the balance of the cart frame 1 can also be enhanced.

Figure 8:
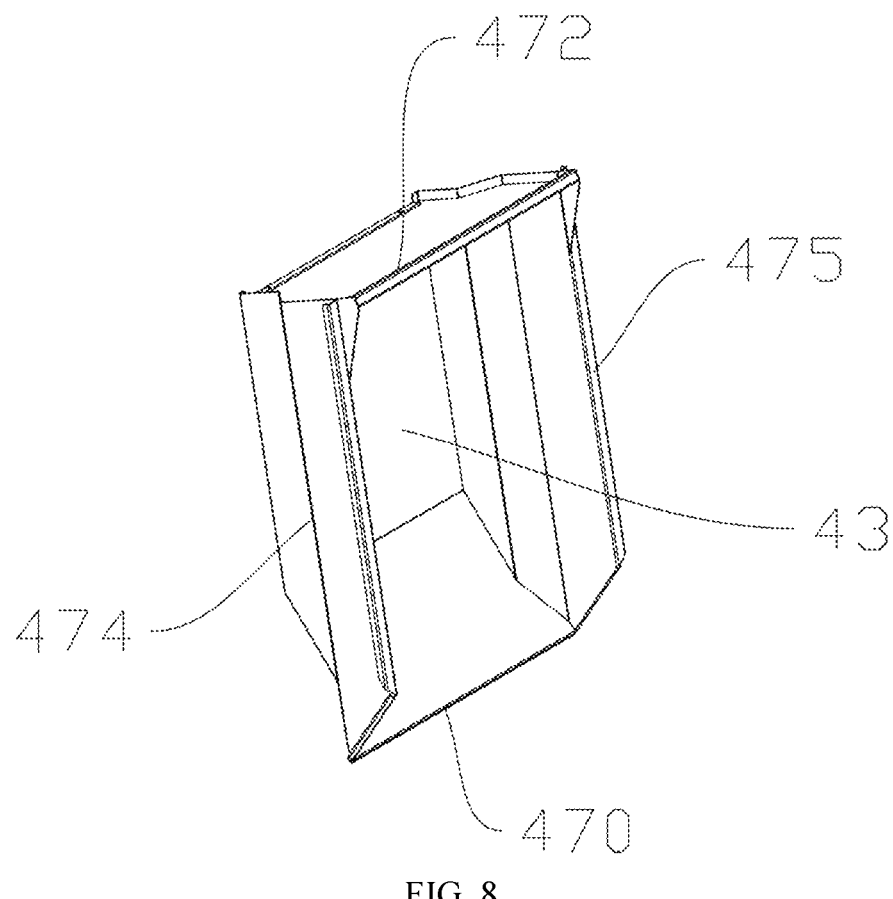
FIG. 8 is a perspective view of a bucket of the electric mini push cart shown in FIG. 6.
Figure 9:
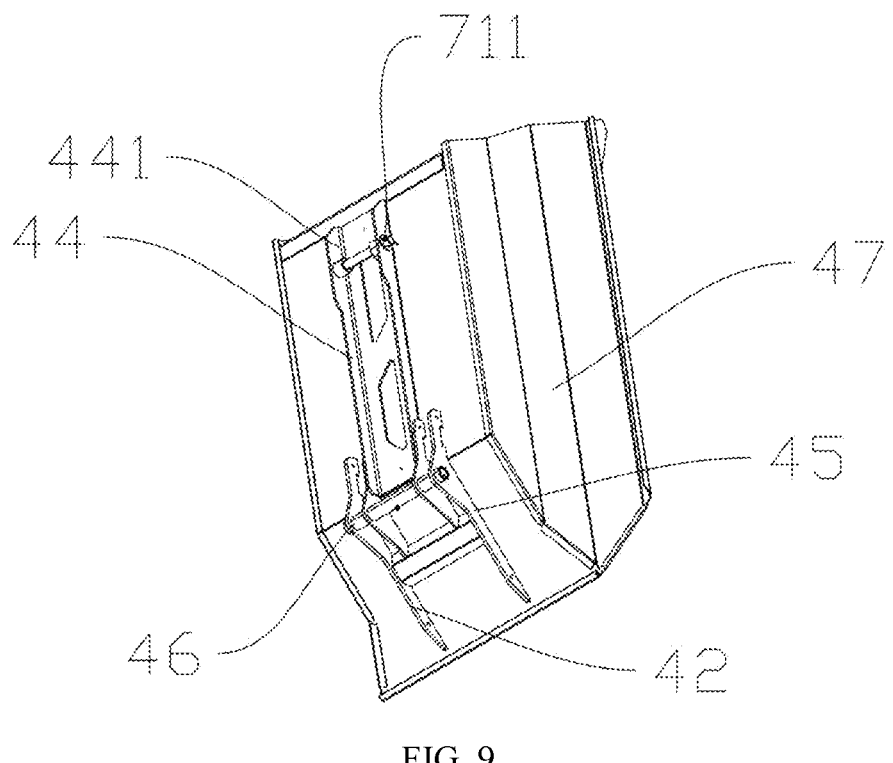
FIG. 9 is another perspective view of the bucket shown in FIG. 8.

Referring to FIGS. 8-9, the bucket 4 includes a bottom 46 and a sidewall 47 extending around the bottom 46. The bottom 46 and the sidewall 47 together define the storage cavity 43. The Objects to be transported can be placed in the storage chamber 43. The bottom 46 faces to the cart frame 1, and the sidewall 47 extends away from the cart frame 1. A mounting member 44 is disposed on one side of the bottom 46 facing to the cart frame 1. The mounting member 44 is located at the middle of the bottom 46 and includes a pair of mounting plates 441. The position of the mounting plate 441 corresponds to the position of the second mounting portion 711. The second mounting part 711 is located between the pair of mounting plates 441, and both ends are rotatably mounted on the mounting plate 441, so that the end of the bucket 4 close to the operation platform 2 is connected to the piston rod 71. The bottom 46 is also symmetrically provided with a plurality of pivot joints 45 on both sides of the pair of mounting plates 441. The position of the pivot portion 45 corresponds to the pair of first connecting ears 113. The pivot shafts 46 respectively pass through the pivot portions 45 and the pair of first connecting ears 113 at both ends are rotatably connected together, so that the end of the bucket 4 away from the operation platform 2 is rotatably connected with the cart frame 1.

The sidewall 47 includes a first sidewall 470, a second sidewall 472, a third sidewall 474, and a fourth sidewall 475. The first sidewall 470 is opposite to the second sidewall 472. The third sidewall 474 and the fourth sidewall 475 connect the first sidewall 470 and the second sidewall 472. The first sidewall 47 is away from the operation platform 2, the second sidewall 472 is close to the operation platform 2, a height of the third sidewall 474 is equal to that of the fourth sidewall 4575, the height of the first sidewall 470 is shorter than that of the third sidewall 474, and the height of the second sidewall 472 is higher than that of the third sidewall 474. The first sidewall 470 and the second sidewall 472 are trapezoidal with a large top and a small bottom, and the height of the first sidewall 470 is lower than the third sidewall 474 and the fourth sidewall 475 to facilitate pouring out the loaded objects. The second sidewall 472 being higher than the third sidewall 474 and the fourth sidewall 475 that reduces the risk of the loaded objects falling when the electric mini push cart 1000 moves forward, at the same time, it ensures that the loading capacity as much as possible, the objects in the bucket 4 are prevented from falling towards the user.

Referring to FIGS. 1-2 and 10-11 the operation platform 2 is substantially in a shape of a vertical flat rectangular block. The operation platform 2 stands on the cart frame 1 and is slightly inclined in a direction away from the bucket 4. The operation platform 2 includes a back side 22 facing the bucket 4, a front side 24 opposite to the back side 22, a left side 26 and a right side 28 connected between the back side 22 and the front side 24, and a top side 27 away from the cart frame 1. The operating components 21 are disposed on the top surface 22. The operating components 21 includes several buttons and/or knobs.

Figure 17:
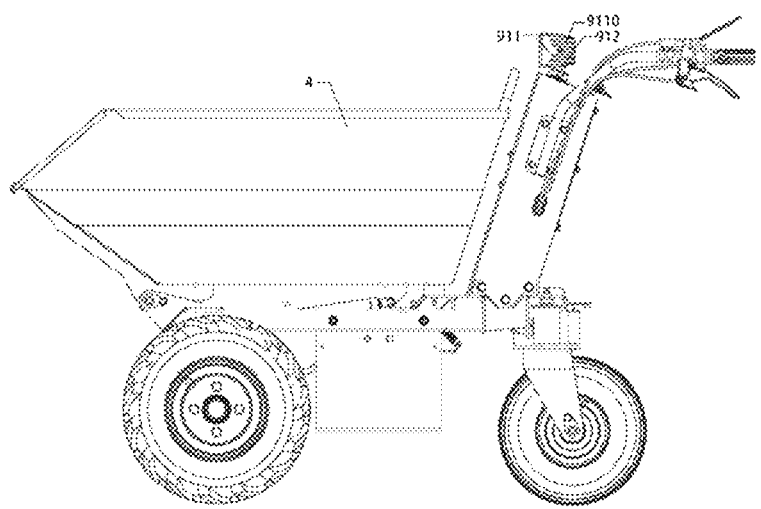
FIG. 17 is another perspective view of the electric mini push cart shown in FIG. 1.
Figure 18:
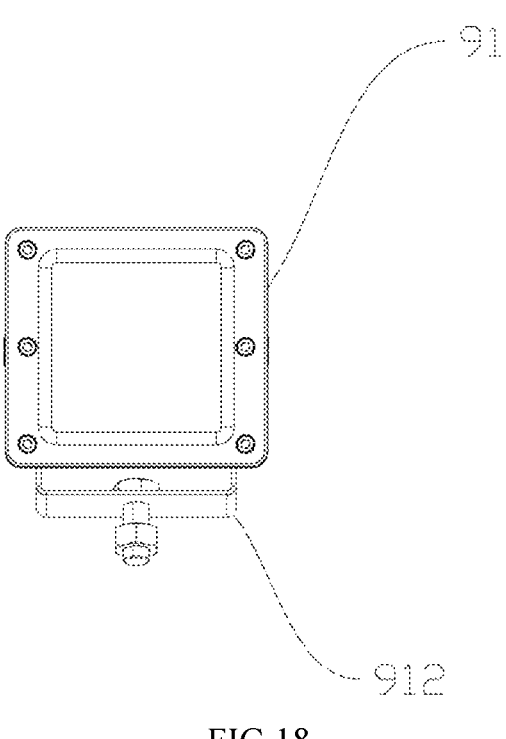
FIG. 18 is a schematic diagram of a main lighting assembly of the electric mini push cart shown in FIG. 1.
Figure 19:
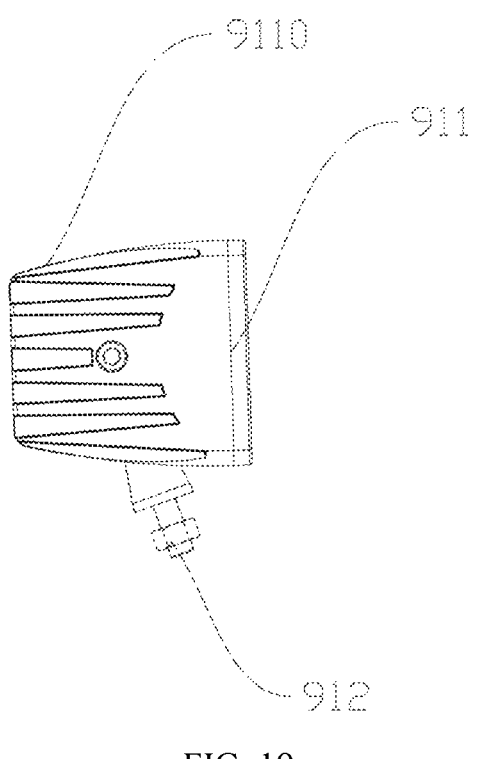
FIG. 19 is a schematic view from another angle of the main lighting assembly shown in FIG. 14.

Referring to FIGS. 17-19, the electric mini push cart 1000 also includes a lighting device 9. The lighting device 9 includes a main lighting assembly 91 and a auxiliary lighting assembly 92. The main lighting assembly 91 includes a lamp 911 and a mounting base 912. The mounting base 912 is fixed on the top side 27 of the operation platform 2. The lamp 911 is configured to emit light and is rotatably mounted on the mount 912, so that the angle of the main lighting assembly 91 in the peripheral direction and the vertical direction can be adjusted. In detail, the lamp 911 is square, and the back of the lamp 911 is provided with cooling fins 9110. Since the main lighting assembly 91 is arranged on the operation platform 2 and can rotate relative to the operation platform 2, The main lighting assembly 91 can shine on the bucket 4 or to the operation platform 2, so that the user can view the objects in the body 4 or facilitate the operation. The operation component 21 on the platform 2 performs operations.

The auxiliary lighting assembly 92 is arranged on the front side of the cart frame 1. The auxiliary lighting assembly 92 includes a rectangular light bar 921 and a lampshade 922. A long side of the rectangular light bar 921 is parallel to the ground. The lampshade 922 covers the light bar 921 to protect the light bar 921. In detail, the auxiliary lighting assembly 92 includes a light-emitting surface in a shape of a strip, and the long side of the light-emitting surface is parallel to the ground. The light bar 921 is elongated, the illumination range is wider, and the road surface that can be illuminated is also wider.

Referring to FIGS. 6-7, combined states of the cart frames and wheel assemblies with different angles are illustrated respectively. The wheel assembly 8 includes a driving wheel assembly 81 and a driven wheel assembly 82. The driving wheel assembly 81 includes driving wheels 810 located on both sides of the front fender 11, and a drive axle 812 for driving the driving wheels 810 to rotate. The drive axle 812 is located above the reinforcing plate 17 and on the side of the front fender 11 facing the bucket 4.

Referring to FIGS. 6, 13-16, the driven wheel assembly 82 includes a pair of universal wheels 820, a balance axle 822 capable of adjustably installing the pair of universal wheels 820 on the cart frame 1, and a locking mechanism 824 to lock the universal wheels 820.

Each universal wheel 820 includes a driven wheel 8202 and a wheel housing 8204 for installing the driven wheel 8202. The wheel housing 8204 includes a top plate 8206 and side plates 8208 connected to both sides of the top plate 8206. The driven wheel 8202 is installed between the two side plates 8208 and is located below the top plate 8206.

The balance axle 822 includes a crossbeam 8220 connecting two universal wheels 820 and a frame body 8222 for installing the crossbeam 8220 on the cart frame 1. Both ends of the crossbeam 8220 are provided with pivot joints 8224, and each pivot joint 8224 is rotatably connected with one universal wheel 820, and then rotationally connected with the top plate 8206, so that the universal wheel 820 can rotate with 360 degrees around the pivot joint 8224. The frame body 8222 is fixed to the operation platform 2. The cart frame body 8222 includes two long mounting plates 8226 opposite to each other and a long cover plate 8228 connected between the two mounting plates 8226. The two mounting plates 8226 and the cover plate 8228 enclose a slot opening downward. One of the mounting plates 8226 is fixed laterally to the operation platform 2 so that the cart frame body 8222 is arranged transversely. The crossbeam 8220 passes through the frame body 8222 and is located between the two mounting plates 8226, and there is a gap between the crossbeam 8220 and the cover plate 8228. A pin shaft 826 runs through the two mounting plates 8226 and the crossbeam 8220 between the two mounting plates 8226. There is a gap between the crossbeam 8220 and the cover plate 8228. An angle between the crossbeam 8220 and a horizontal direction can be adjusted, in other words, the height of each universal wheel 820 relative to the ground can be adjusted. As a result, when the electric mini push cart 1000 moves on an uneven road, the crossbeam 8220 can be used to adjust the height of the two driven wheels 8202, so that the two driven wheels 8202 can be in contact with the road surface.

The locking mechanism 824 includes two socket parts 8240 arranged on the crossbeam 8220 and corresponding to the positions of the two universal wheel 820 respectively, a pin shaft assembly 824 passing through the socket parts 8240, and a locking hole 8241 is disposed on the top plate 8206. The pin shaft assembly 8242 includes a locking rod 8244, an elastic member 8246 sleeved on the locking rod 8244, and an operating member 8248 fixed at one end of the locking rod 8244. The operating member 8248 is pivotally connected to one end of the locking rod 8244. The locking rod 8244 can be inserted into the locking hole 8241 by the operating member 8248 and locked to the universal wheel 820 to be relatively fixed, so that the direction of each universal wheel 820 is locked, and the elastic member 8246 is compressed to generate elastic force. At the same time, the operating member 8248 can be operated to unlock the locking rod 8244, and under the action of elastic force, The locking rod 8244 can disengage from the locking hole 8241 and the universal wheel 820, so that the universal wheel 820 can resume 360-degree rotation.

Figure 10:
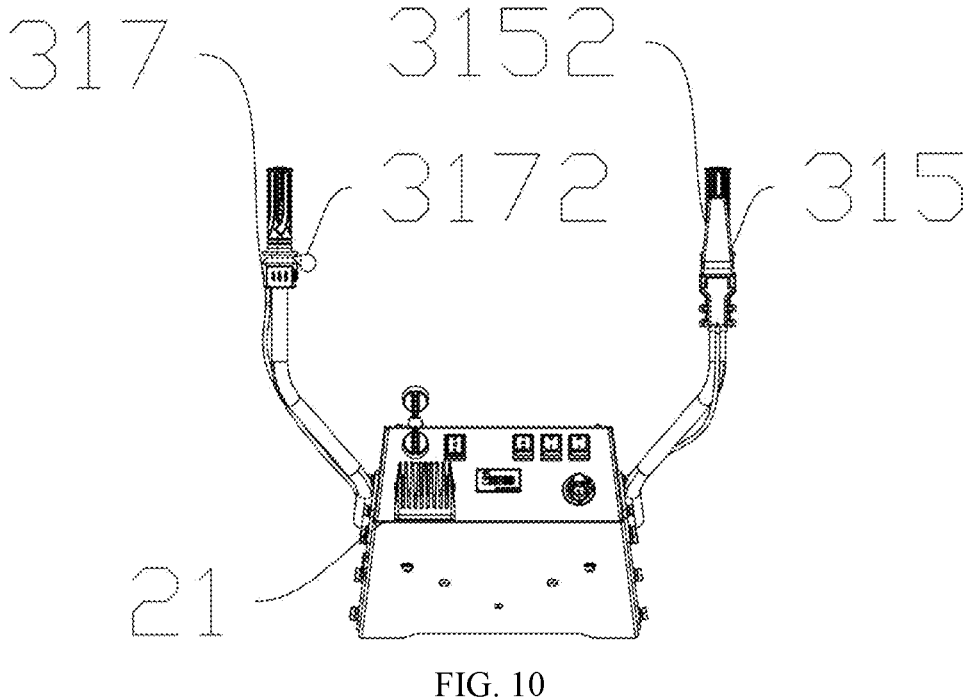
FIG. 10 is a perspective view of the operation platform of the electric mini push cart shown in FIG. 1.
Figure 11:
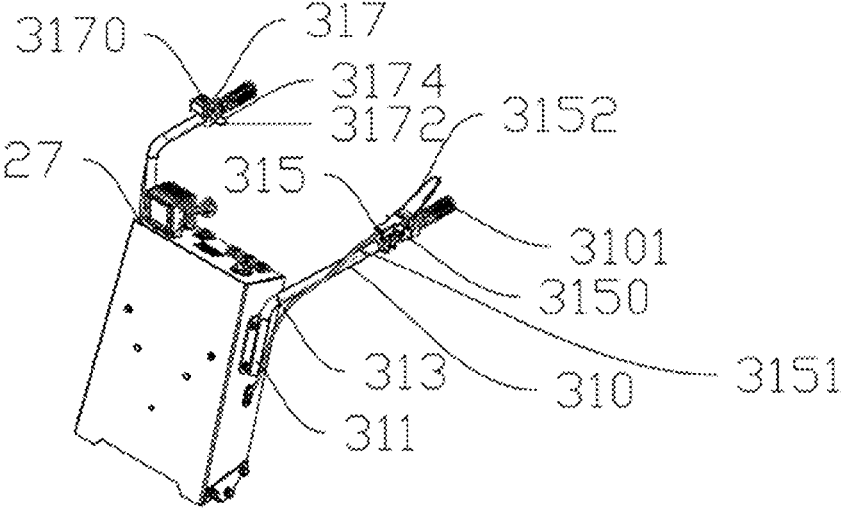
FIG. 11 is another perspective view of the operation platform shown in FIG. 10.
Figure 12:
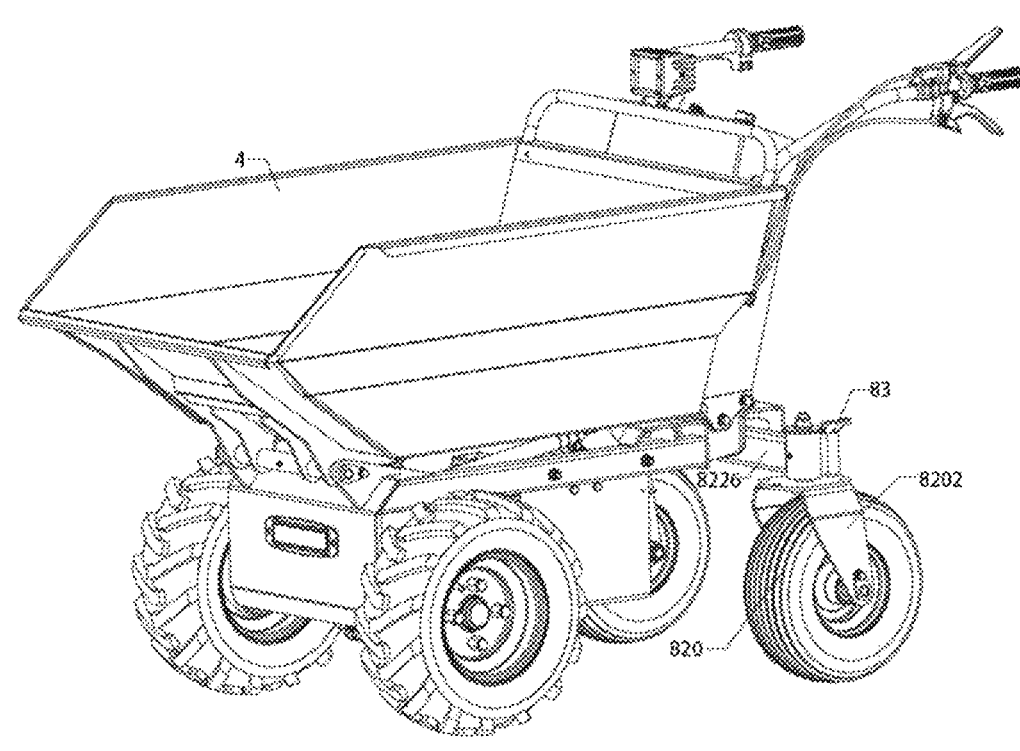
FIG. 12 is another perspective view of the electric mini push cart shown in FIG. 1.
Figure 13:
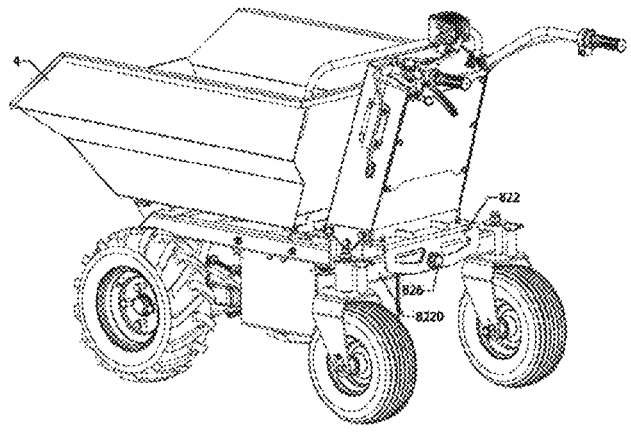
FIG. 13 is another perspective view of the electric mini push cart shown in FIG. 1.
Figure 14:
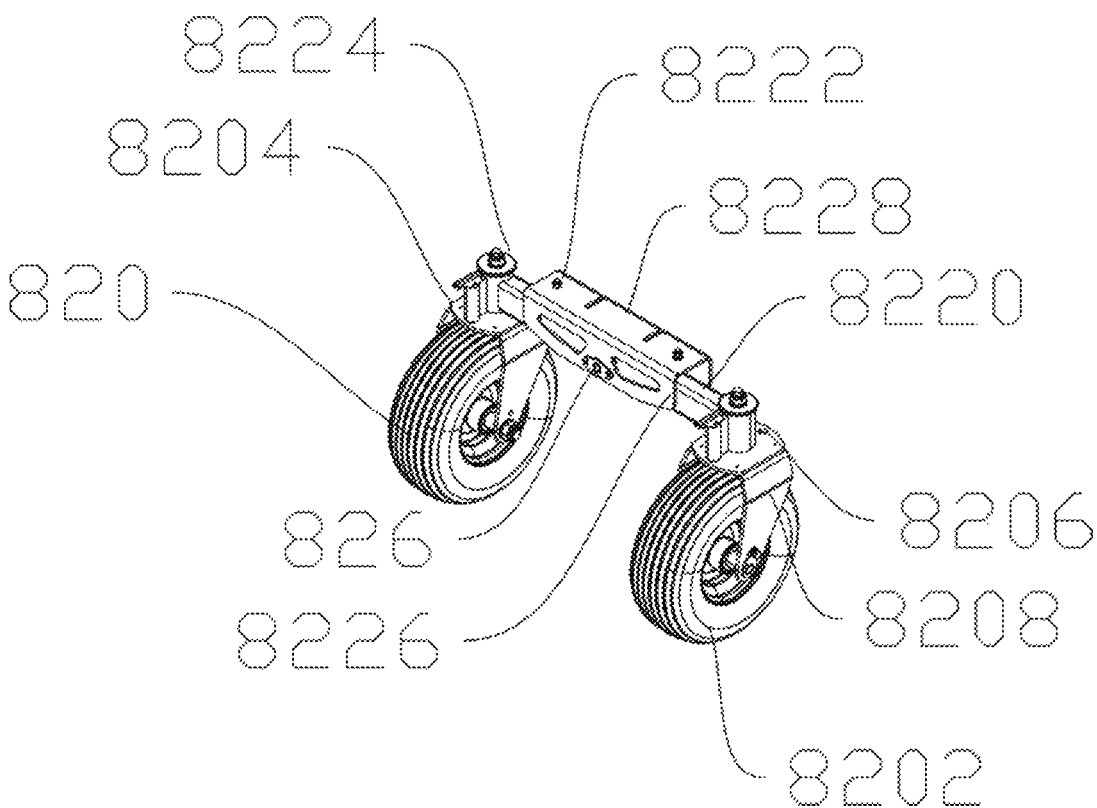
FIG. 14 is a perspective view of the driven wheel assembly of the wheel assembly shown in FIG. 7.
Figure 15:
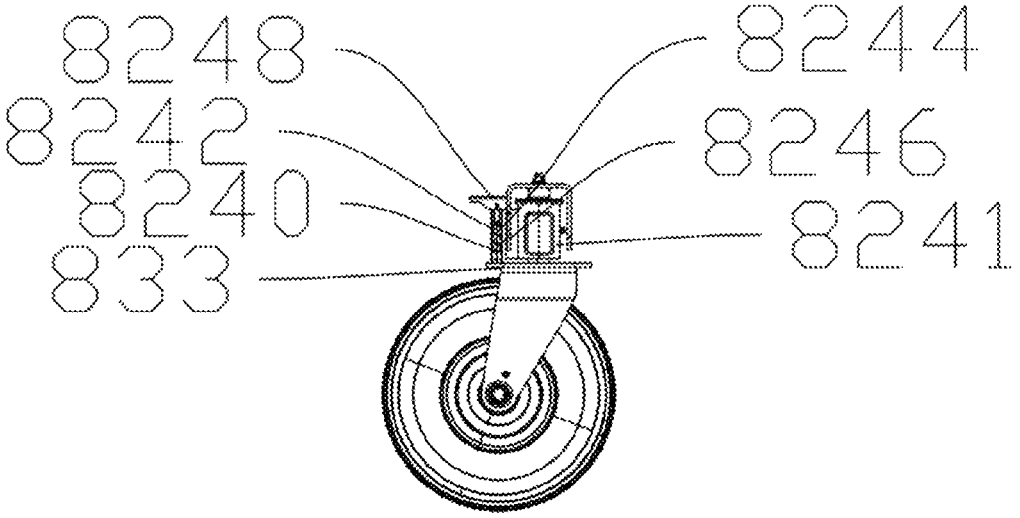
FIG. 15 is another perspective view of the driven wheel assembly shown in FIG. 12.
Figure 16:
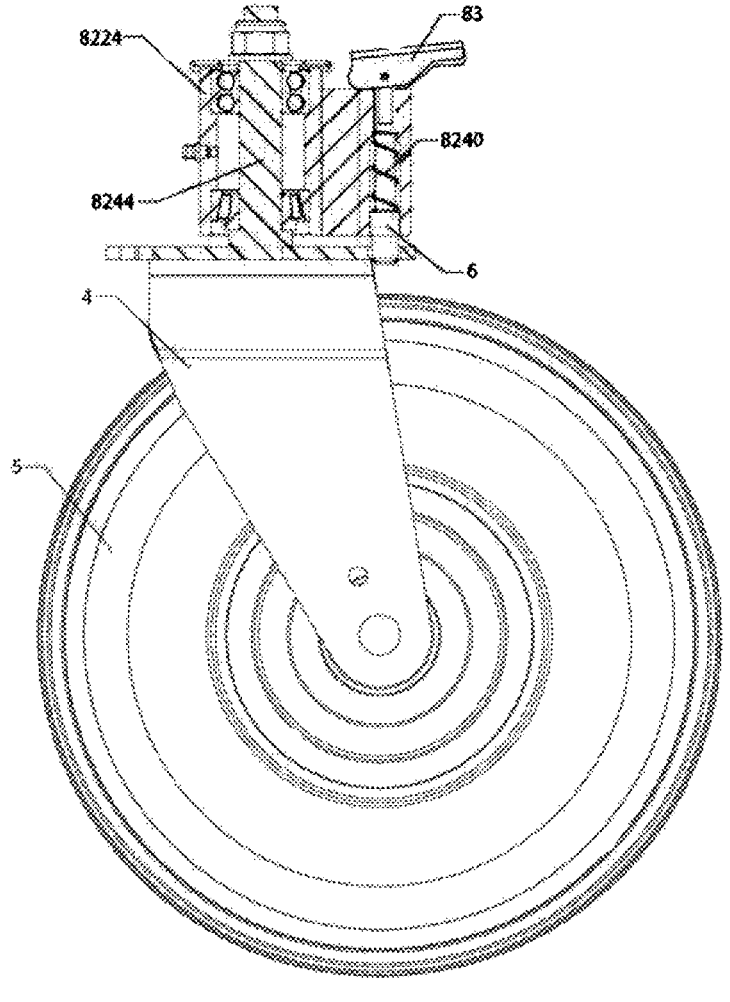
FIG. 16 is another perspective view of the driven wheel assembly shown in FIG. 12.

Referring to FIGS. 1 and 10-11, the handle assembly 3 includes two handles 31 arranged symmetrically. The handles 31 are respectively fixed on the left side 26 and the right side 28. And the two handles 31 respectively extend towards a direction away from the bucket 4. Each handle 31 includes a fixing section 311 and an expansion section 313 extending away from the bucket 4. from the fixing section 311 to form a main handle 310. The main handle 310 is provided with a hand holding portion 3101.

Figure 23:
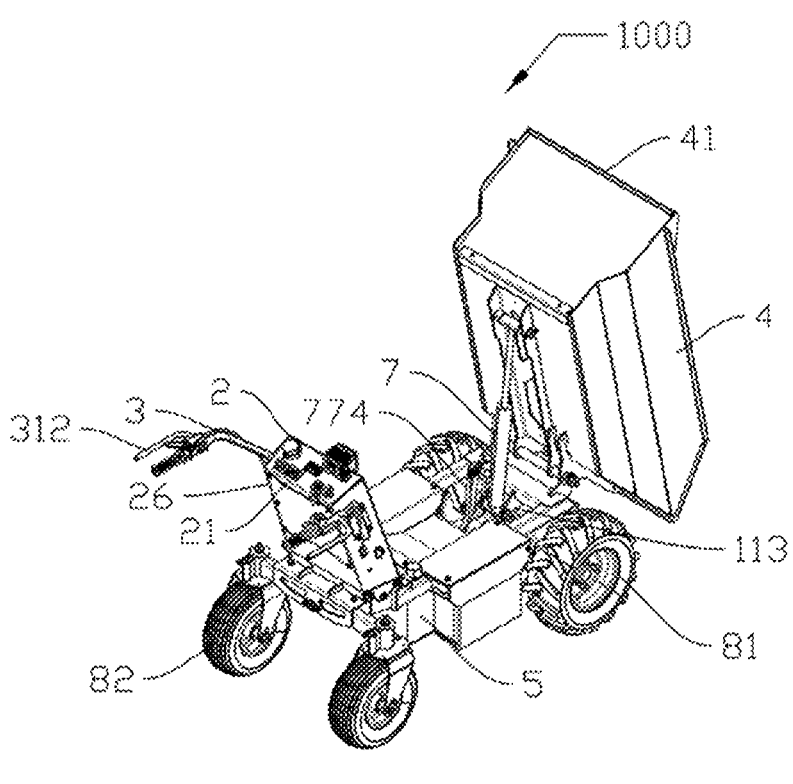
FIG. 23 is a perspective view of the electric mini push cart in accordance with a third embodiment.

Referring to FIG. 23, an electric mini push cart in accordance with a second embodiment is illustrated. Differences between the electric mini push cart in the second embodiment is different from the electric mini push cart in the first embodiment is: each handle 31 is provided with a main handle 310 and an auxiliary rod 312 extending in parallel from the outside of the main handle 310. At the same time, the main handle 310 is bent outwards to extend out the auxiliary rod 312. The auxiliary rob 312 is arranged in parallel with the main handle 310. The auxiliary lever 312 is thinner than the main handle 310. The auxiliary rod 312 is configured to prevent hands of the user from being scratched by other objects when the electric mini push cart is turning in a small space, and plays a protective role.

Figure 20:
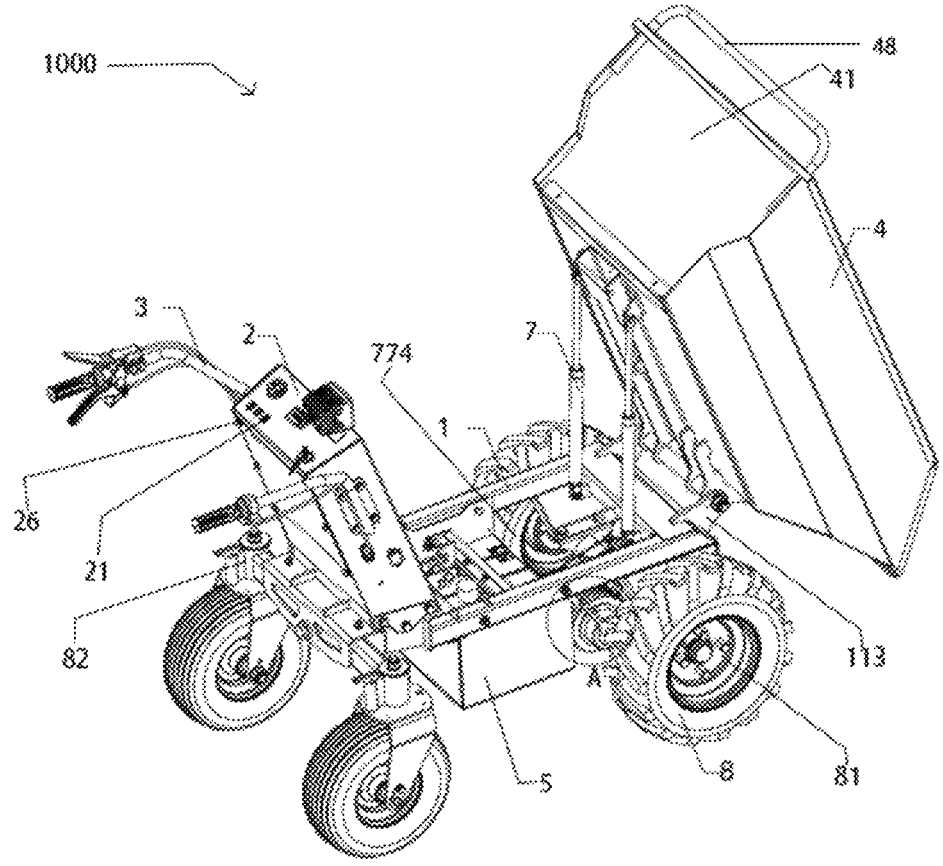
FIG. 20 is another perspective view of the electric mini push cart in FIG. 1.
Figure 21:
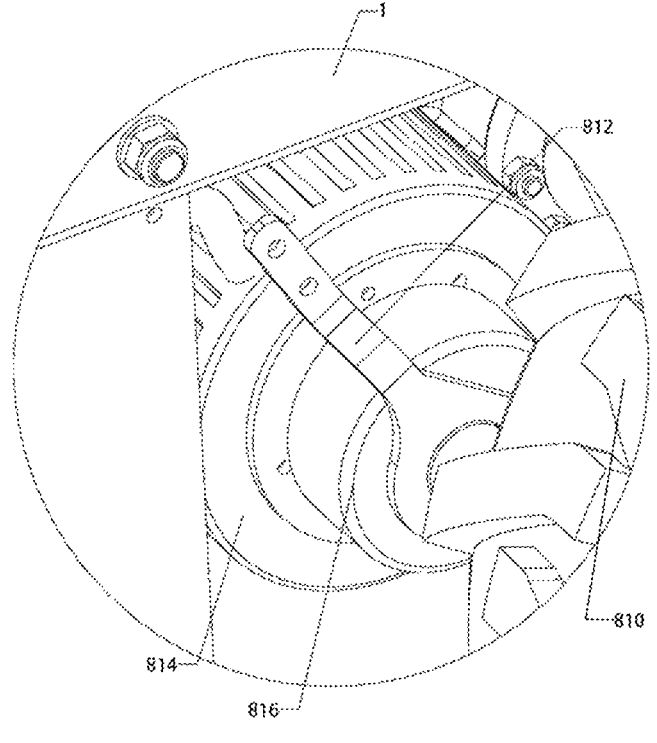
FIG. 21 is a partially enlarged view of the wheel assembly shown in FIG. 1.

Referring to FIGS. 20-21, a safety handbrake 315 is provided by one of the two handles 31 to brake the electric mini push cart 1000, an accelerator control assembly 317 is provide by the other of of the two handles 31 to control a moving speed of the electric mini push cart 1000. In this embodiment, the handle 31 arranged on the left side 26 is provided with the safety handbrake 315, and the handle 31 arranged on the right side 26 is provided with the accelerator control assembly 317.

The safety handbrake 315 includes a trigger part 3150 fixed to the main handle 310, and a pressing piece 3152 rotatably connected to the trigger part 3150. The trigger part 3150 is electrically connected to an electromagnetic brake 816 through the cable 3151 and is configured to trigger the electromagnetic brake to work or stop working. The electromagnetic brake 816 is also electrically connected to the trigger brake assembly 814, and is configured to trigger the brake assembly 814 to brake the electric mini push cart 1000. The trigger part 3150 is sleeved on the main handle 310 and adjacent to the hand holding portion 3101, and the trigger part 3150 is provided with a trigger switch (not shown in the figure). The pressing piece 3152 is located above the holding portion 3101 and partly opposite to the hand holding portion 3101, there is a certain gap between the pressing piece 3152 and the holding portion 310. When the pressing piece 3152 is gripped tightly together with the holding portion 3101 and close to the holding portion 3101, the pressing piece 3152 triggers the trigger switch 3151 to close, and generates a control signal to control the operation of the electromagnetic brake 816, so that the brake assembly 814 cannot act on the wheel assembly 8 makes the electric mini push cart 1000 travel. When the pressing piece 3152 is released and separated from the hand holding portion 3101, the trigger switch 3151 is disconnected, and the electromagnetic brake 816 cannot be controlled to work, so that the brake assembly 814 acts on the wheel assembly 8, so that the electric mini push cart 1000 cannot continue to move forward. More specifically, the safety handbrake 315 is electrically connected to the electromagnetic brake 816.

When the safety handbrake 315 is held, the electromagnetic brake 816 is energized, so that the electromagnetic brake 816 releases the brake assembly 814, and the electric mini push cart 1000 can move. The braking mode of the safety handbrake 315 and the electromagnetic brake 816 can make the electric mini push cart 1000 brake quickly in an emergency, and when the handle is released, electric mini push cart 1000 enters into the brake state immediately and effectively prevents electric mini push cart 1000 from slipping when parking.

Figure 22:
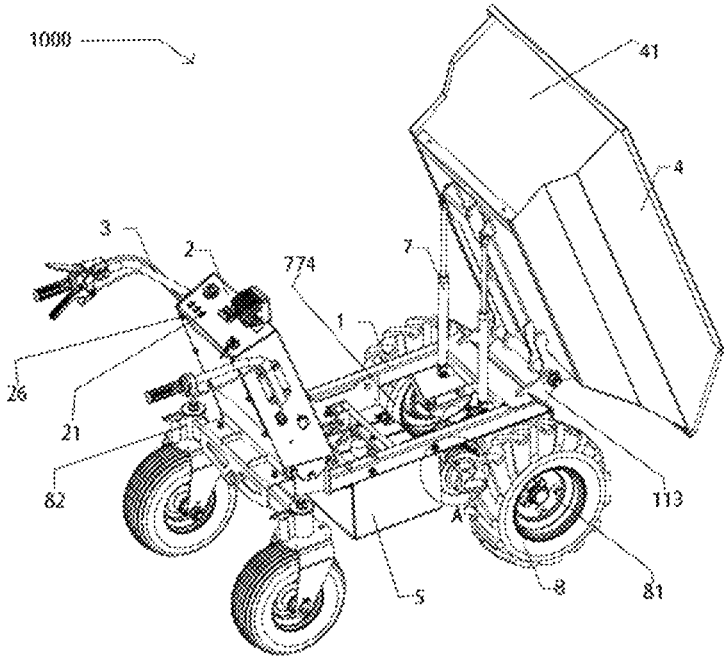
FIG. 22 is a perspective view of the electric mini push cart in accordance with a second embodiment.

Referring to FIG. 22, an electric mini push cart in accordance with a third embodiment is illustrated. Differences between the third embodiment and the first embodiment is that the third embodiment is provided with a cross bar 48 on a side of the bucket 4 close to the operation platform 2.

The accelerator control assembly 317 includes a rotating part 3170 and an accelerator operating part 3172 disposed on the rotating part 3170. The accelerator control assembly 317 is integrally formed. The rotating part 3170 is rotatably mounted on the main handle 310 and adjacent to the hand holding portion 3101. The accelerator operating part 3172 is in a shape of a sheet. The accelerator operating part 3172 includes a pressing surface 3174 adapted to a shape of the front side of the thumb. The accelerator operating part 3172 protrudes toward the other handle 31 along a direction perpendicular to the main handle 310, and the pressing surface 3174 is arranged horizontally. The accelerator control assembly 317 is electrically connected to the motor (not shown) of the electric mini push cart 1000 through a cable. If the accelerator needs to be adjusted, the throttle operation part 3172 can be pressed with the thumb, so that the rotating part 3170, and the angle at which the rotating part 3170 turns can control the speed of the motor, thereby achieving the effect of adjusting the accelerator.

Obviously, those skilled in the art can make various changes and modifications to the application without departing from the spirit and scope of the application. In this way, if these modifications and variations of this application fall within the scope of the claims of this application and their equivalent technologies, this application is also intended to include these modifications and variations.

The above-listed are only preferred embodiments of the application, and certainly cannot limit the scope of rights of the application. Therefore, equivalent changes made according to the claims of the application still fall within the scope of the application.

The invention claimed is:

1. An electric mini push cart, comprising:
a cart frame, including a front side and a rear side;
an operation platform arranged on the rear side;
a bucket, configured to load objects and located on one side of the operation platform; the bucket including a first end close to the operation platform and a second end away from the first end, the second end being rotatably installed on the front side; and
a hydraulic power device, driving the bucket to turn over, the hydraulic power device installed on the cart frame and located below the bucket, the hydraulic power device including a piston rod connected to the first end, wherein when the hydraulic power device is working, the piston rod is stretched or retracted to push or pull back the first end, so that the bucket turns around the second end, and moves away from the operation platform or falls back in a direction towards the operation platform;
wherein, the hydraulic power device further comprises an oil cylinder, a hydraulic power unit, and a hydraulic oil pipe connected between the oil cylinder and the hydraulic power unit; the hydraulic power unit is arranged on the cart frame to provide power for the oil cylinder; the oil cylinder is also connected to the piston rod, and an end of the oil cylinder far away from the piston rod is provided with a first installing part, an end of the piston rod far away from the piston rod is provided with a second installing part, the first installing part is fixed to the cart frame, and the second installing part is fixed to the bucket;
wherein, the electric mini push cart further comprises an assembly box, and battery packs; the assembly box is suspended from the cart frame and below the bucket, the assembly box includes a first receiving portion and two second receiving portions located on both sides of the first receiving portion; the hydraulic power unit is accommodated in the first receiving portion, each of the two second receiving portions are configured to place one battery pack.

2. The electric mini push cart according to claim 1, wherein the first installing part includes a first connecting shaft, and the second installing part includes a second connecting shaft parallel to the first connecting shaft, the piston rod extends along a first direction, the first connecting shaft and the second connecting shaft are placed perpendicular to the first direction in which the piston rod extends, and two ends of the first connecting shaft are connected to the cart frame, and two sections of the second connecting shaft are connected with the bucket.

3. The electric mini push cart according to claim 1, the hydraulic oil pipe is partially accommodated in the assembly box, and partly passes through the assembly box, the oil cylinder is located outside the assembly box, and is located on one side of the assembly box away from the operation platform.

4. The electric mini push cart according to claim 3, wherein the assembly box includes a bottom, the hydraulic oil pipe includes an oil outlet pipe and an oil return pipe, and the oil outlet pipe and the oil return pipe are also passed through the bottom for positioning the oil outlet pipe and oil return pipe.

5. The electric mini push cart according to claim 4, wherein the hydraulic power unit includes a first oil outlet and a first oil return port, and the oil cylinder includes a second oil outlet and a second oil return port, the first oil outlet and the second oil outlet communicate with each other via the oil outlet pipe, the first oil return port and the second oil return port communicate with each other via the oil return pipe, the first oil return port and the first oil outlet are respectively located on different opposite sides of the hydraulic unit, and the second oil return port and the second oil outlets are respectively located on the same side of the oil cylinder; one of the oil outlet pipe and the oil return pipe is located in the assembly box and partially wound around the hydraulic power unit to be connected with the oil outlet pipe, and extends adjacently and side by side with the other one of the oil return pipe and the oil return pipe.

6. The electric mini push cart according to claim 1, wherein the cart frame includes a front fender, and two symmetrical longitudinal beams, the front fender is located opposite to the operation platform, and the front fender are respectively connected end to end with two longitudinal beams to form the cart frame, and the assembly box is suspended under the two longitudinal beams.

7. The electric mini push cart according to claim 1, wherein the operation platform includes a control assembly to control operation of the hydraulic power device.

8. The electric mini push cart according to claim 1, wherein the electric mini push cart further comprises a locking mechanism and a wheel assembly, the wheel assembly comprises universal wheels, each universal wheel comprising a wheel and wheel housing, the locking mechanism having a pin shaft assembly to detachably insert to the wheel housing to enable the universal wheel to move in one fixed direction.

9. The electric mini push cart according to claim 8, wherein the locking mechanism further comprises two socket parts, a locking hole defined in the wheel housing, the pin shaft assembly further comprises a locking rod, an elastic member sleeved on the locking rod, and an operating member fixed at one end of the locking rod, the operating member is pivotally connected to one end of the locking rod, the locking rod can be inserted into the locking hole by the operating member and locked to the universal wheel to be relatively fixed, and the elastic member is compressed to generate elastic force.

10. The electric mini push cart according to claim 9, wherein the locking rod is unlocked when the operating member is operated, and the locking rod is separated from the locking hole under the elastic force, and the wheel is restored to rotate relative to the cart frame.

11. The electric mini push cart according to claim 10, wherein the operating member is pivoted to the locking rod, the locking rod is locked when the operating member is rotated to a first angle, and the locking rod is unlocked when the operating member is rotated to a second angle.

12. The electric mini push cart according to claim 11, wherein a quantity of the universal wheels is two, the universal wheels are mounted on the rear side of the cart frame.

13. The electric mini push cart according to claim 8, wherein the wheel assembly comprises:

a frame body, fixed to the cart frame along a transverse direction;

a crossbeam, passing through the frame body along the transverse direction, a gap forming between the crossbeam and the frame body in a longitudinal direction, and the gap configured to enable the crossbeam to move in a vertical direction;

two wheels, symmetrically mounted to the crossbeam; and a pin shaft, running through the frame body and the crossbeam located in the frame body, and enabling the crossbeam to be pivoted to the frame body, the transverse direction and the longitudinal direction being in a horizontal plane and perpendicular to each other.

14. The electric mini push cart according to claim 1, further comprising a handle assembly which comprises two handles, wherein one of the handles equipped with a safety handbrake, the safety handbrake comprises a trigger part sleeved on the one handle, and a pressing piece rotatably connected to the trigger part, the trigger part is electrically connected to an electromagnetic brake through a cable, and is configured to trigger the electromagnetic brake to work or stop working.

15. The electric mini push cart according to claim 1, further comprising a handle assembly which comprises two handles, wherein one of the handles equipped with an accelerator control assembly, the accelerator control assembly comprises a rotating part and an accelerator operating part disposed on the rotating part, the accelerator operating part protrudes toward the other handle along a direction perpendicular to the handle.

16. The electric mini push cart according to claim 15, wherein the accelerator operating part includes a pressing surface adapted to a shape of a front side of a thumb.

17. The electric mini push cart according to claim 15, further comprising:

a first lighting assembly rotatably installed on the operating platform; and a second lighting assembly mounted on the front of the cart frame.

18. An electric mini push cart, comprising:

a cart frame, including a front side and a rear side;

an operation platform arranged on the rear side;

a bucket, configured to load objects and located on one side of the operation platform; and a hydraulic power device, driving the bucket to turn over, the hydraulic power device installed on the cart frame and located below the bucket, the hydraulic power device including a piston rod connected to the bucket, wherein when the hydraulic power device is working, the piston rod is stretched or retracted, so that the bucket turns around the second end, and moves away from the operation platform or falls back in a direction towards the operation platform;

wherein, the hydraulic power device further comprises an oil cylinder, a hydraulic power unit, and a hydraulic oil pipe connected between the oil cylinder and the hydraulic power unit; the hydraulic power unit provides power for the oil cylinder; the oil cylinder is further connected to the piston rod;

wherein, the electric mini push cart further comprises an assembly box, the assembly box is suspended from the cart frame and below the bucket, the assembly box includes a first receiving portion; the hydraulic power unit is accommodated in the first receiving portion; wherein the assembly box further comprises two second receiving portions located on both sides of the first receiving portion; each of the two second receiving portions is configured to place a battery pack.

19. The electric mini push cart according to claim 18, wherein the cart frame includes a front fender, and two symmetrical longitudinal beams, the front fender is located opposite to the operation platform, and the front fender are respectively connected end to end with two longitudinal beams to form the cart frame, and the assembly box is suspended under the two longitudinal beams.

* * * * *